(12) United States Patent
Jeon et al.

(10) Patent No.: US 7,116,981 B2
(45) Date of Patent: Oct. 3, 2006

(54) APPARATUS AND METHOD FOR CHANNEL QUALITY ESTIMATION AND LINK ADAPTATION IN ORTHOGONAL FREQUENCY DIVISION MULTIPLEXING (OFDM) WIRELESS COMMUNICATION SYSTEM

(75) Inventors: Taehyun Jeon, Seoul (KR); Woo-Yong Lee, Daejeon (KR); Jae-Young Ahn, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 400 days.

(21) Appl. No.: 10/440,667

(22) Filed: May 19, 2003

(65) Prior Publication Data

US 2004/0110510 A1     Jun. 10, 2004

(30) Foreign Application Priority Data

Dec. 9, 2002  (KR) ............... 10-2002-0077998

(51) Int. Cl.
    *H04Q 7/20*    (2006.01)
    *H04J 11/00*   (2006.01)
(52) U.S. Cl. .......... 455/450; 455/67.11; 455/464; 370/208; 370/210
(58) Field of Classification Search ........... 455/67.11, 455/67.13, 67.16, 69, 522, 450, 452.1, 464; 370/208, 210, 332, 912, 913; 375/346
See application file for complete search history.

(56) References Cited

U.S. PATENT DOCUMENTS 6,385,462 B1    5/2002   Baum et al.
6,512,758 B1 *  1/2003   Sato et al. ............. 370/203
6,522,706 B1 *  2/2003   Bahai et al. ........... 375/343
6,782,271 B1 *  8/2004   Huh et al. ............. 455/522
6,850,498 B1 *  2/2005   Heath et al. ........... 370/332
2002/0110138 A1* 8/2002  Schramm .............. 370/332
2002/0126694 A1* 9/2002  Kahola ................. 370/465

FOREIGN PATENT DOCUMENTS

KR    1020020041196    6/2002

OTHER PUBLICATIONS

Paul Lettieri et al., Adaptive Frame Length Control for Improving Wireless Link Throughput, Range, and Energy Efficiency, 0-7803-4383-2/98; 1998 IEEE (pp. 564-571).

Daji Qiao et al., Goodput Enhancement of IEEE 802.11a Wireless LAN via Link Adaptation, 0-7803-7097-1/01, 2001 IEEE (pp. 1995-2000).

* cited by examiner

*Primary Examiner*—Quochien B. Vuong
(74) *Attorney, Agent, or Firm*—Blakely Sokoloff Taylor & Zafman

(57) ABSTRACT

A method for channel quality estimation and link adaptation for an OFDM wireless communication system includes: (a) estimating a channel gain and a noise power, and measuring an SNR in consideration of the estimated channel gain and noise power; (b) calculating a correlation value between an externally received preamble signal and a known preamble signal, and estimating a delay spread; (c) measuring the quality status of a channel in consideration of the measured SNR and the estimated delay spread; and (d) determining parameters including transmit power, data modulation mode, and data rate, according to the measured quality status of the channel, and performing a link adaptation using a protocol for acknowledging a normal signal transmission as well as using the SNR and the delay spread.

10 Claims, 6 Drawing Sheets

APPARATUS AND METHOD FOR CHANNEL QUALITY ESTIMATION AND LINK ADAPTATION IN ORTHOGONAL FREQUENCY DIVISION MULTIPLEXING (OFDM) WIRELESS COMMUNICATION SYSTEM

CROSS REFERENCE TO RELATED APPLICATION

This application is based on Korea Patent Application No. 2002-77998 filed on Dec. 9, 2002 in the Korean Intellectual Property Office, the content of which is incorporated herein by reference.

BACKGROUND OF THE INVENTION (a) Field of the Invention

The present invention relates to a method for channel quality estimation and link adaptation. More specifically, the present invention relates to an apparatus and method for channel quality estimation and link adaptation in orthogonal frequency division multiplexing (OFDM) wireless communication systems.

(b) Description of the Related Art

For an operation of wireless communication networks with an optimal throughput in a time-varying channel environment, appropriate link adaptation for communication links through which data transmission occurs is necessary.

Link adaptation is an approach for properly selecting parameters including transmit power or modulation mode according to the status of channels in a wireless communication environment, and maintaining an optimal throughput. The status of channels can be analyzed by different methods based on the measurements of bit error rate (BER) or packet error rate (PER), the number of packet retransmissions, or signal-to-noise ratio (SNR).

The related documents suggest a method of estimating the quality of communication links and determining an optimal data rate or an optimal length of packet using the estimated quality of communication links.

For example, D Qiao et al. published a related paper under the title of "Goodput Enhancement of IEEE 802.11 a Wireless LAN via Link Adaptation" (IEEE International Conference on Communications, 2001, Page(s) 1995 to 2000), which discloses a link adaptation method using the determination of a transmission mode as an existing link adaptation method in combination with the determination of the frame length to acquire an optimal throughput.

Another document concerned is "Adaptive Frame Length Control for Improving Wireless Link Throughput, Range, and Energy Efficiency (Proceedings, INFOCOM'98)" by P. Lettieri et al., which discloses a method of determining an optimal frame length so as to acquire an optimal throughput in a wireless communication system, thereby enhancing data rate and transmission distance.

SUMMARY OF THE INVENTION

It is an advantage of the present invention to provide an apparatus and method for channel quality estimation and link adaptation in an OFDM wireless communication system that determines an optimal data rate and an optimal transmit power in consideration of both a signal-to-noise ratio (SNR) and a delay spread causing frequency-selective fading in estimating the quality of channels for data transmission, thereby enhancing throughput and hence system performance.

In one aspect of the present invention, there is provided a method for channel quality estimation and link adaptation for an orthogonal frequency division multiplexing (OFDM) wireless communication system, the method including: (a) estimating a channel gain and a noise power, and measuring a signal-to-noise ratio in consideration of both the estimated channel gain and the estimated noise power; (b) calculating a correlation value between an externally received preamble signal and a known preamble signal, and estimating a delay spread; (c) measuring the quality status of a channel in consideration of the measured signal-to-noise ratio and the estimated delay spread; and (d) determining parameters including transmit power, data modulation mode, and data rate, according to the measured quality status of the channel, and performing link adaptation.

The step (d) includes: using a protocol for acknowledging a normal data transmission at a data transmitter and a data receiver, as well as using the measured quality status of the channel.

In another aspect of the present invention, there is provided an apparatus for channel quality estimation and link adaptation that includes: an analog-to-digital converter for converting an externally received signal to a digital signal; a guard time remover for removing a guard time from the converted digital signal; a fast Fourier transform (FFT) unit for converting the signal removed of the guard time to a signal in a frequency domain; a channel quality estimator for measuring quality status of a channel in consideration of a signal-to-noise ratio and a delay spread, using the converted digital signal and the signal in the frequency domain; and a link adaptor for determining parameters including transmit power, data modulation mode, and data rate using the measured quality status of the channel and a protocol for acknowledging a normal data transmission at a data transmitter and a data receiver, and performing a link adaptation.

In further another aspect of the present invention, there is provided a recording medium with a built-in program, said recording medium including a method for channel quality estimation and link adaptation, the program including: estimating a channel gain and a noise power, and measuring a signal-to-noise ratio in consideration of both the estimated channel gain and the estimated noise power; calculating a correlation value between an externally received preamble signal and a known preamble signal, and estimating a delay spread; measuring quality status of a channel in consideration of both the measured signal-to-noise ratio and the estimated delay spread; and determining parameters including transmit power, data modulation mode, and data rate using the measured quality status of the channel and a protocol for acknowledging a normal data transmission at a data transmitter and a data receiver, and performing a link adaptation.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Now, a description will be given as to a method for estimating the quality of communication links connecting a transmitter to a receiver and selecting an optimal data rate and an optimal transmit power using the estimated quality for data transmission through multipath fading wireless communication channels in an OFDM system, according to an embodiment of the present invention.

First, a detailed construction of the OFDM system performing channel quality estimation and link adaptation using the estimated channel quality according to the embodiment of the present invention will be described as follows.

Figure 1:
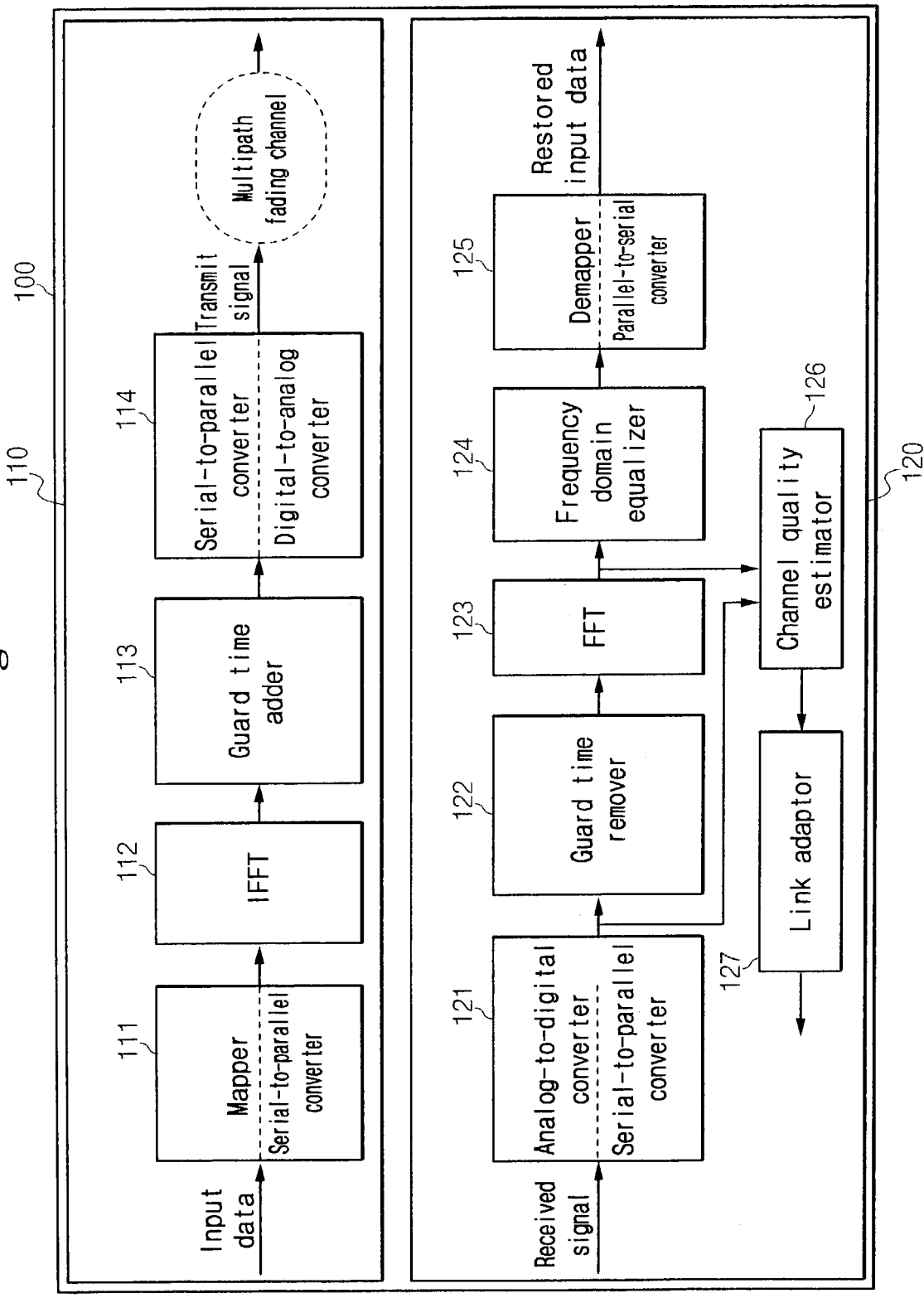
FIG. 1 is a schematic of an OFDM wireless communication system according to an embodiment of the present invention.

FIG. 1 is a schematic of an OFDM wireless communication system according to an embodiment of the present invention.

The OFDM wireless communication system 100 according to the embodiment of the present invention comprises, as shown in FIG. 1, a transmitter 110 and a receiver 120.

The transmitter 110 comprises a mapper 111, an IFFT (Inverse Fast Fourier Transform) unit 112, a guard time adder 113, and a parallel-to-serial converter 114. The receiver 120 comprises an analog-to-digital converter 121, a guard time remover 122, an FFT (Fast Fourier Transform) unit 123, a frequency domain equalizer 124, a demapper 125, a channel quality estimator 126, and a link adapter 127.

The mapper 111 is constructed with a serial-to-parallel converter, the parallel-to-serial converter 114 is constructed with a digital-to-analog converter, the analog-to-digital converter 121 is constructed with a serial-to-parallel converter, and the demapper 125 is constructed with a parallel-to-serial converter.

Now, the operation of the OFDM wireless communication system 100 will be described in brief as follows.

First, a description will be given as to the respective functions and the corresponding operation of the transmitter 110.

Upon receiving digital input data in the binary form to be transmitted, the mapper 111 converts the digital input data to symbols (in the complex form) in the frequency domain by a modulation mode used for OFDM sub channels, and allocates the converted symbols to defined sub channels.

The mapper 111 also inserts pilot signals into the defined sub channels for the purpose of tracking and compensating for carrier frequency errors or sampling frequency errors for channel quality estimation. In this manner, a predetermined amount of data is converted to symbols according to the modulation mode used for sub channels, and the converted data and pilot signals are sent to the IFFT 112 via the serial-to-parallel converter.

The IFFT 112 converts the data and the pilot signals received from the serial-to-parallel converter to signals in the time domain, and sends the converted signals to the guard time adder 113. The guard time adder 113 adds a guard time to the received signals to make provisions for a delay spread that mainly causes performance deterioration in a wireless channel environment.

Subsequently, the parallel-to-serial converter 114 converts the signals received from the guard time adder 113 to serial signals consecutive in the time axis. The digital-to-analog converter 114 converts digital signals to analog signals and then prepares analog signals to be transmitted via an antenna. The signals transferred via the antenna pass through wireless communication channels having the characteristic of multipath fading channels.

Next, a description will be given as to the respective functions and the corresponding operation of the receiver 120.

First, upon receiving analog signals from the transmitter 110 via the antenna, the analog-to-digital converter 121 converts the received analog signals to digital signals.

The guard time remover 122 removes the guard time from the converted digital signals, and the FFT 123 converts the time domain signals received from the guard time remover 122 to signals in the frequency domain. The converted digital signals in the frequency domain are then sent to the serial-to-parallel converter 121.

The frequency domain equalizer 124 restores the signals distorted by communication channels, and the demapper 125 converts the restored signals from the symbols in the complex form to binary data. The parallel-to-serial converter converts the binary data to the restored input data.

The output signals of the FFT 123 and the analog-to-digital converter 121 are fed into the channel quality estimator 126 according to the embodiment of the present invention. The channel quality estimator 126 estimates a signal-to-noise ratio (SNR) and a delay spread of channels based on the input signals. The link adaptor 127 performs a link adaptation according to the result of estimation, i.e., determines an optimal data rate and an optimal transmit power, thereby enhancing the throughput.

The process for channel quality estimation and link adaptation in the above-constructed OFDM wireless communication system will now be described in detail with reference to the accompanying drawings.

First, a description will be given as to a method for channel quality estimation of communication links.

Signal-to-noise ratio (SNR) that is one of the parameters determining the quality of channels can be measured as follows.

The SNR measurement in the OFDM system includes determining a channel response and a noise power spectrum in each sub carrier of OFDM symbols.

The estimation method as used herein is divided into a method of using a known data value such as a preamble or a pilot positioned in the leading part of the packet, and a method of using payload data.

More specifically, the method of using preamble data causes a lot of estimation errors when a small number of samples are used for estimation, but the method of using a pilot signal enables SNR estimation only for sub channels having the pilot positioned therein but provides more accurate results of estimation than the method of using preamble data when the length of packet exceeds a predetermined level.

In the SNR estimation method according to the embodiment of the present invention, the SNR value is estimated in sub channels having pilots positioned therein, and the estimated SNR value is averaged to select the final estimated value.

Now, a description will be given as to an SNR estimation method using the above-stated estimation step.

In the embodiment of the present invention, the SNR estimation method based on estimation of channel gain and noise power will be described. In particular, the method for calculating both the channel gain and the noise power can be summarized as follows.

For channel gain estimation, the following equation is calculated:

$$\bar{Y}_n = \frac{1}{L}\sum_{i=1}^{L} Y_{n,i} \qquad \text{[Equation 1]}$$

where $Y_{n,i}$ is a signal obtained by dividing the n-th sub channel signal having the pilot of the i-th OFDM symbol positioned therein by a corresponding pilot signal. The final channel gain estimation from Equation 1 is given by:

$$\hat{H}_n = \bar{Y}_n \qquad \text{[Equation 2]}$$

In the meanwhile, for noise power estimation, the average of the received signal power of sub channels having pilots positioned therein can be calculated as follows.

$$P_{rx} = \frac{1}{L}\sum_{i=1}^{L} |Y_{n,i}|^2 \qquad \text{[Equation 3]}$$

The SNR estimation in the n-th sub channel having the pilot positioned therein after L OFDM symbol intervals can be calculated as follows.

$$SNR_{est,n} = \frac{|\hat{H}_n|^2}{P_{rx} - |\bar{Y}_n|^2} \qquad \text{[Equation 4]}$$

The final SNR estimation is calculated as an averaged SNR in the sub channels having the pilot positioned therein.

$$SNR_{est} = \frac{1}{N_p}\sum_{n=1}^{N_p} SNP_{est,n} \qquad \text{[Equation 5]}$$

where $N_p$ is the number of sub channels having pilot positioned therein in one OFDM symbol. The correlation between the averaged SNR estimation and the number of OFDM symbols is illustrated in FIG. 2.

Figure 2:
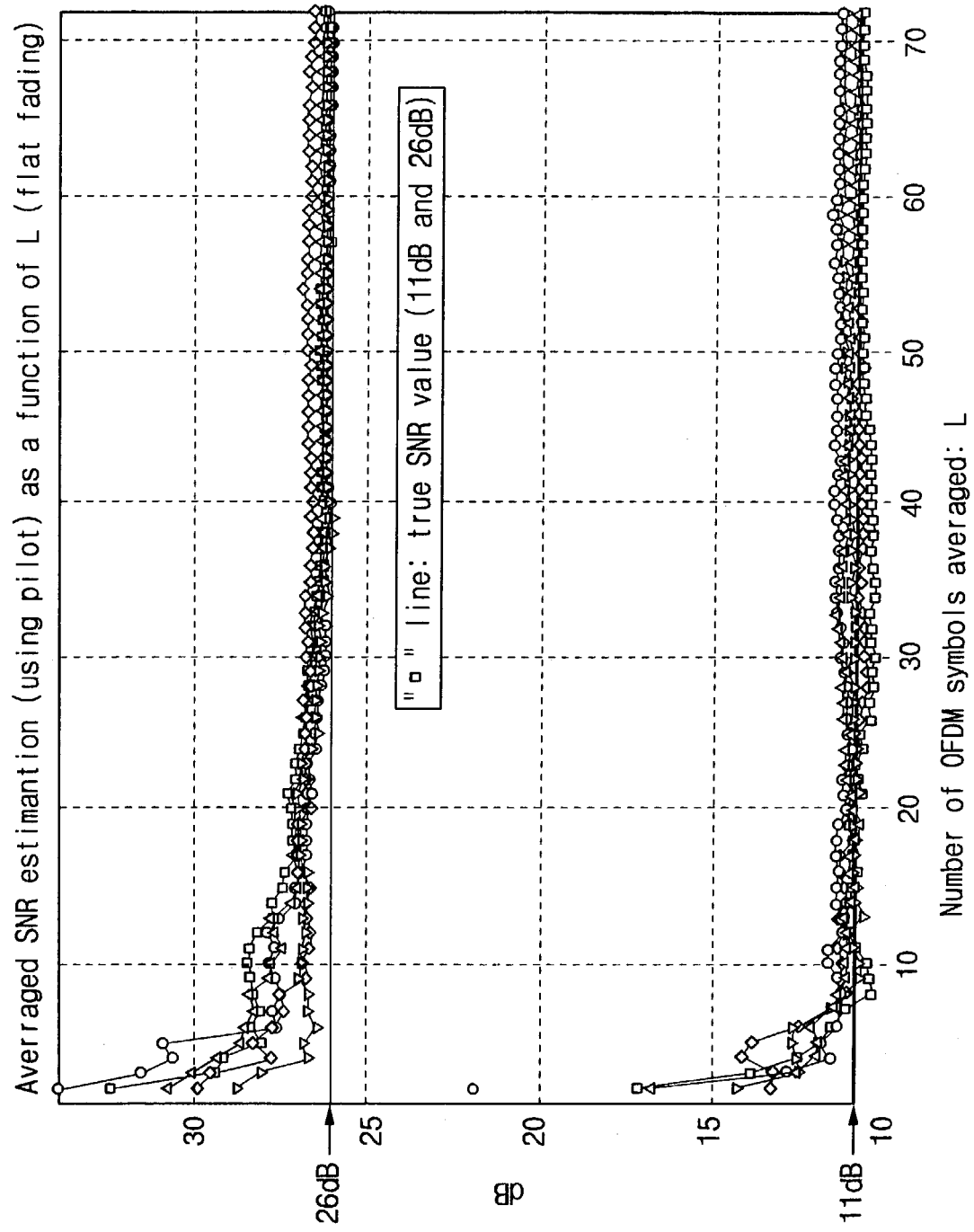
FIG. 2 shows the result of channel quality estimation using pilot signals in AWGN channels according to an embodiment of the present invention.

FIG. 2 shows the result of channel quality estimation using pilot signals in AWGN channels according to an embodiment of the present invention.

As illustrated, the estimation approaches the final convergence within 1 dB when the number L of OFDM symbols used for estimation is 15 to 20.

Next, a description will be given as to a process for estimation of a delay spread, which is one of the parameters used for channel quality estimation.

Delay spread is one of the parameters determining the system performance in a multipath fading channel environment. In the embodiment of the present invention, the final quality of channels is determined in consideration of both the SNR estimation and the delay spread estimation.

With the delay spread, the individual sub channels in the frequency domain have a different channel gain. The channel gain variation between sub channels is determined by the delay spread. Generally, a large delay spread value causes serious performance deterioration. Namely, the performance of the system may be changed with a variation of the delay spread value even when the SNR estimation (the averaged SNR in pilot sub channels) is the same. Accordingly, the performance deterioration of the OFDM system becomes more serious.

The delay spread estimation using cross correlation according to the embodiment of the present invention will now be described as follows.

The effect of delay spread appears in the form of an inter-symbol interference (hereinafter referred to as "ISI") in which the current simple value on the time axis has an effect on the adjacent simple values. Namely, when the auto-correlation function of a preamble used in the packet-based communication system approaches a delta function, the delay spread of channels can be estimated as follows.

$$z_k = y_k * x^*_{-k} = (x_k * h_k) * x^*_{-k} \qquad \text{[Equation 6]}$$
$$= (x_k * x^*_{-k}) * h_k$$
$$\approx \delta_k * h_k \approx h_k$$

where $y_k$ is the received preamble signal, and $x_k$ is transport data. In other words, $y_k$ is the value of $x_k$ including the effect of channels (excepting the effect of noise).

As stated in the above assumption, when the correlation of a preamble approaches a delta function, the cross correlation between the preamble signal and the transport data approaches a channel response, $h_k$, as demonstrated in Equation 6.

Figure 3:
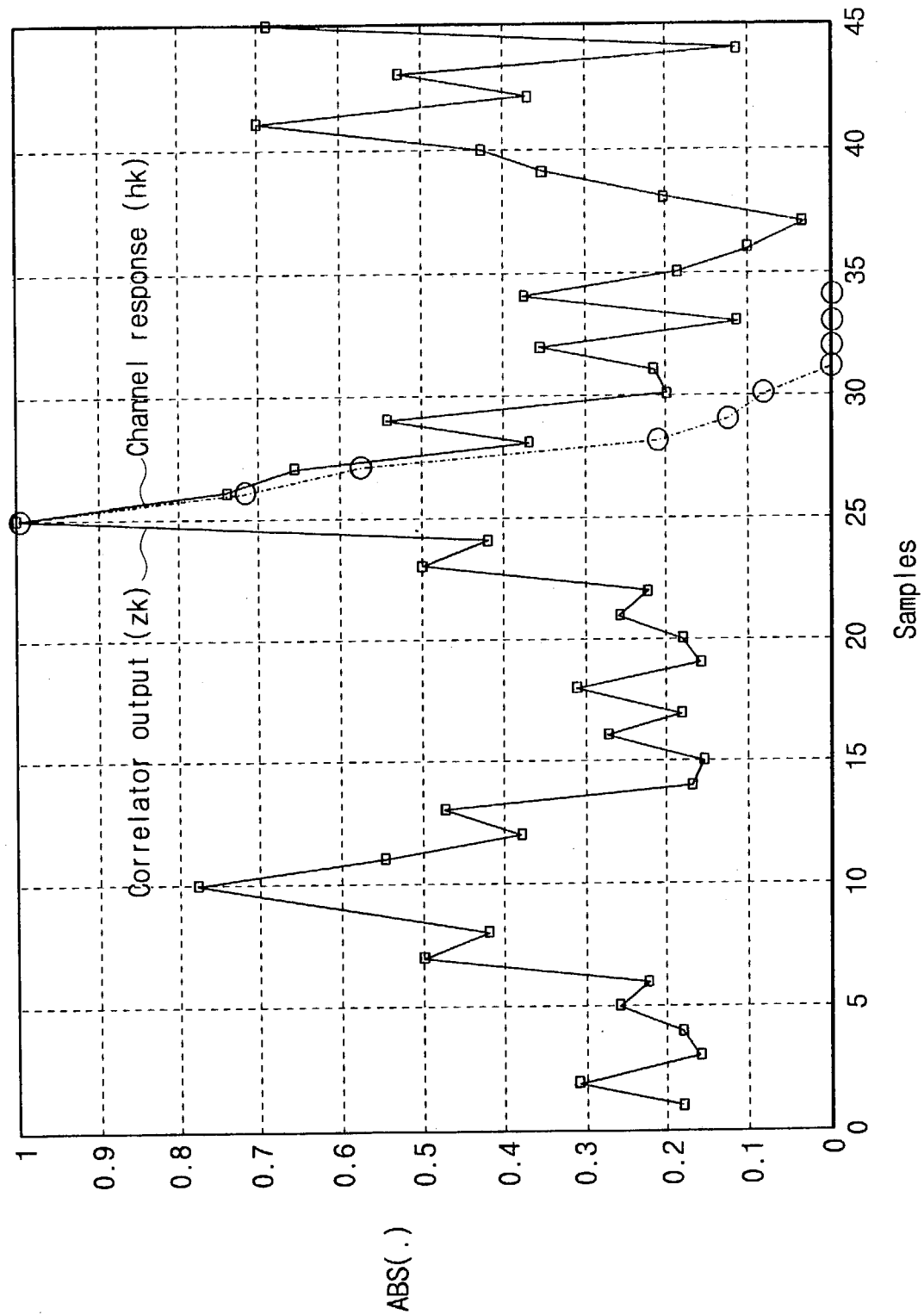
FIG. 3 shows a comparison of a cross correlation value and an actual channel gain according to an embodiment of the present invention.

FIG. 3 shows a comparison of an actual channel response (circle-dotted line) and the output (square-dotted line) of a correlator according to an embodiment of the present invention for a short preamble satisfying the IEEE dotted 802.11 a wireless LAN standard.

The correlator output (square-dotted line) is obtained by correlating 32 samples corresponding to a short preamble having two periods with received short preamble signals including the effect of channels. The short preamble is repeated with a period of 16 samples and the correlation value also has a period of 16 samples.

The absolute value of the correlator output is proportional to that of the channel response. Namely, the difference between the actual channel gain value and the correlation value occurs due to the effect of noise and also because the auto-correlation value of the short preamble does not approach the delta function.

Following the delay spread estimation step, the time index is set to zero when the output $z_k$ of the correlation repeating with a period of the preamble is at maximum during the period $z_k$. The squares of the absolute values accumulated from time 0 to 9 $P_0$ to $P_9$ are then determined as follows.

$$P_k = \sum_{i=0}^{k} |z_i|^2 \qquad \text{[Equation 7]}$$

In channel quality estimation using the delay spread estimation, the embodiment of the present invention utilizes the fact that the coefficients in the time axis of the channel response are distributed in the leading part of the channel response as the delay spread decreases in the wireless communication channel. Using this characteristic, the estimation of the delay spread based on the preamble and the accumulated power proportional to the estimated delay spread can be determined as follows.

First, a description will be given as to the determination of the cross correlation value.

The correlation value between a received preamble signal and a known preamble signal can be calculated as follows.

$$z_k = y_k {}^* x_{\_k^*} \qquad \text{[Equation 8]}$$

where $y_k$ is a received short preamble signal sample passing through the channel, and $x_k$ is a known preamble signal.

The maximum of $|z_k|^2$ in an interval having a length equal to the period the preamble is calculated, and the time index at that time is set to zero. The accumulated power $p_k$ is then calculated.

$$p_k = \sum_{i=0}^{k} |z_i|^2, \text{ for } k = 0 \text{ to } 9 \qquad \text{[Equation 9]}$$

The normalized estimation of accumulated power can be calculated as follows.

$$ch\_pwr = p_1/p_9$$

where ch_pwr is the sum of the two initial channel response coefficients normalized with the total channel power (assuming 10 coefficients).

In this manner, the algorithm related to the status estimation of communication channels according to the embodiment of the present invention is calculated in the physical layer PHY, which sends the SNR estimation and the channel power estimation as calculated above to the media access control (MAC) layer.

The MAC layer performs a link adaptation, i.e., determines the types and values of parameters including modulation mode, data rate, and transmit power, based on the power distribution of SNR and delay spread as received from the physical layer PHY.

As described above, the method for channel quality estimation and link adaptation in an OFDM wireless communication system according to the embodiment of the present invention involves estimating the quality status of a channel in consideration of both the estimated signal-to-noise ratio and the estimated delay spread, and performing a link adaptation by determining the types and values of related parameters such as modulation mode, data rate, or transmit power, based on the estimated quality status of the channel, thereby enhancing the throughput, and for a mobile terminal, increasing a use time through an efficient operation of the transmit power.

Next, a description will be given as to a method for link adaptation when there is no mechanism of a first station or a first access point A forwarding information on the status of communication channel to a correspondent station (i.e., a second station) or a correspondent access point (i.e., a second access point B) with reference to the accompanying drawing.

Figure 4:
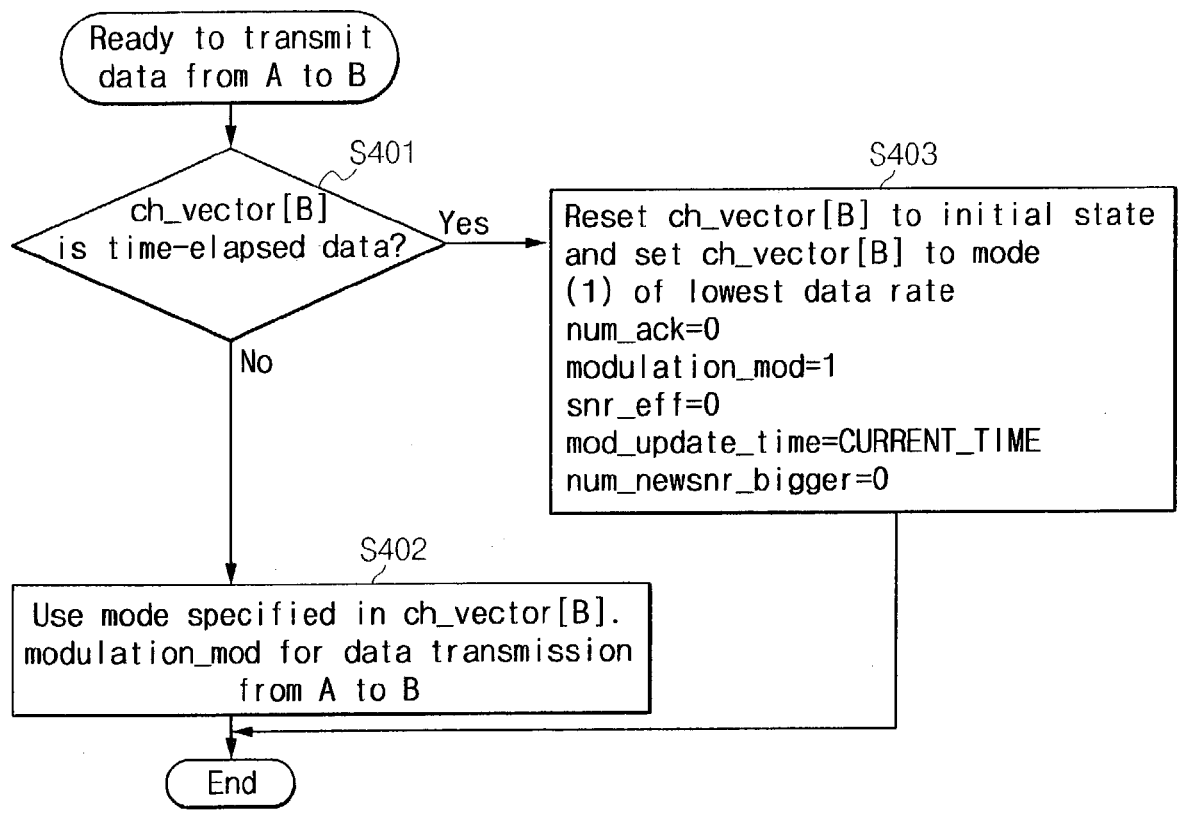
FIG. 4 is a flow chart showing the sequential operation of determining a data modulation mode when a first station sends data to a second station, according to an embodiment of the present invention.
Figure 5A:
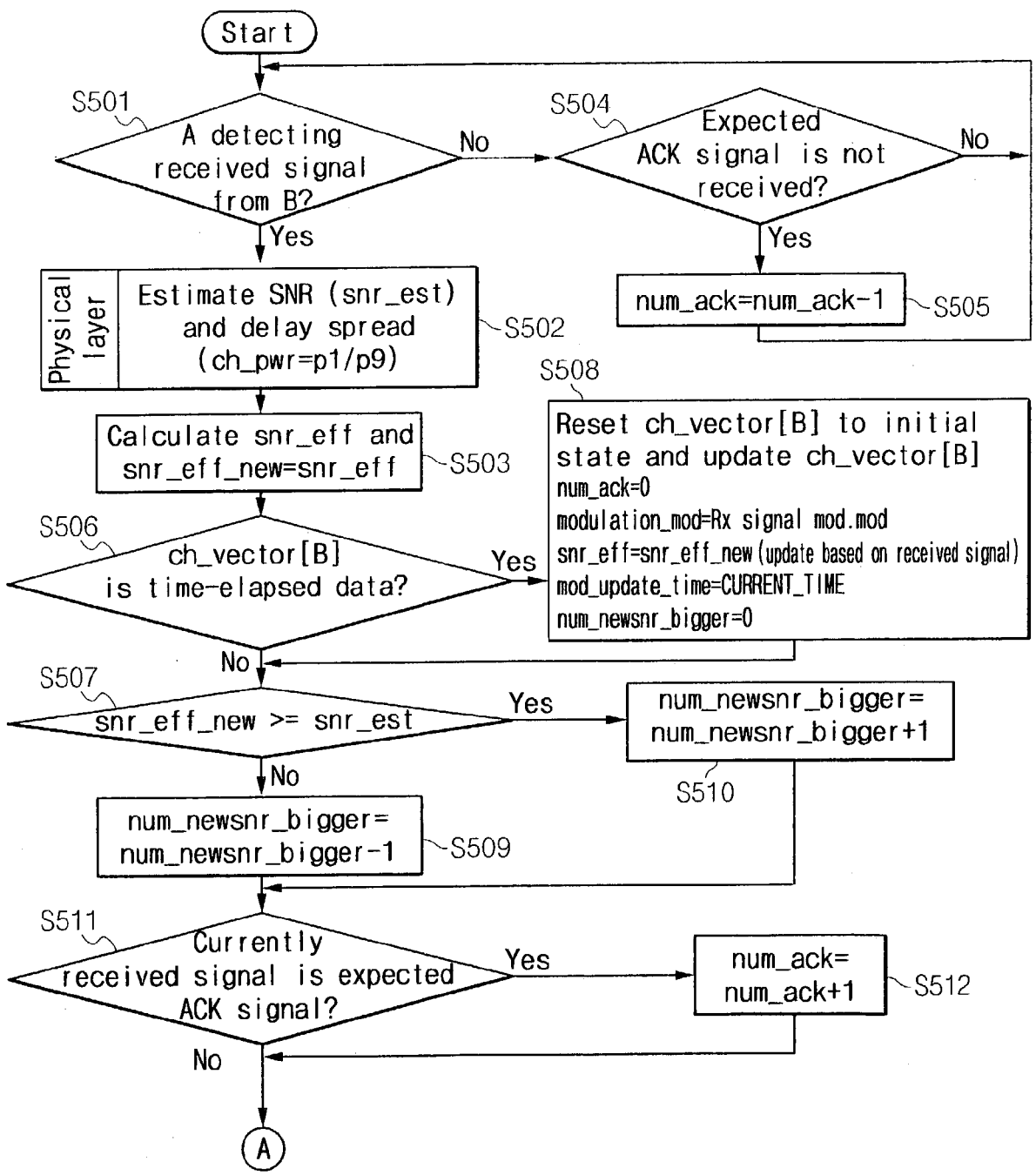
FIGS. 5a and 5b are flow charts showing the sequential operation of determining a modulation mode for data transmission from the first station to the second station based on the received signal from the second station according to an embodiment of the present invention.
Figure 5B:
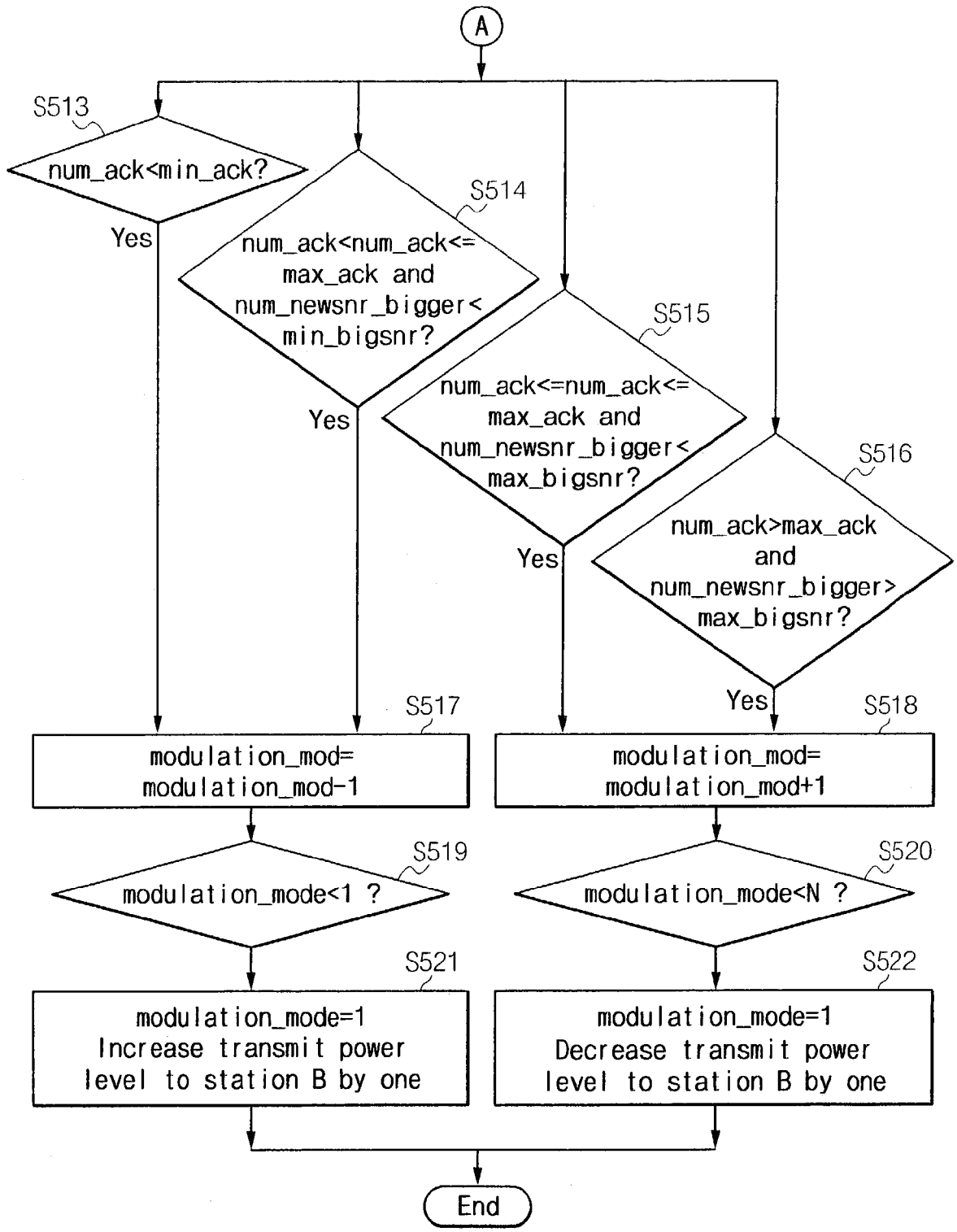

FIG. 4 is a flow chart showing the sequential operation of determining a modulation mode when the first station sends data to the second station, according to an embodiment of the present invention. FIG. 5 presents flow charts showing the sequential operation of determining a modulation mode for data transmission from the first station to the second station based on the received signal from the second station according to the embodiment of the present invention.

In this case, the first access point A infers channel information of a communication link (A→B) using a signal received from the second access point B. The channel information inferable includes the quality status of the channel through the above-stated channel power distribution according to the signal-to-noise ratio (SNR) and the delay spread, and the reception acknowledgement signal (e.g., an ACK-related signal) of the second access point B for the packet on the corresponding link (A→B). The process for inferring the channel information based on the above information will now be described in detail as follows.

When the first access point A transmits data to the second access point B, it is checked in step 401 whether or not information from the first access point A to the second access point B does not exist or if recorded information is old. If the information is old, then the first access point A selects a most stable modulation mode or a lowest data rate in the current transmit power (Tx power) level and attempts data transmission. The first access point A initializes a channel status vector ch_vector for the second station prepared for link adaptation, and updates the selected data rate and its update time, in step 401.

If the channel status vector ch_vector includes recently updated data rate information that has not expired, then the first access point A sends data to the second access point B at the corresponding data rate, in step 402.

The respective factors of the channel status vector ch_vector and their details are presented in Table 1.

TABLE 1

| Factor of ch_vector | Range of factor | Ref. |
|---|---|---|
| Num_ack | min_ack: 1; max_ack | (1) |
| modulation_mode | 1:1:N | (2) |
| snr_eff | min_snr: 1: max_snr | (3) |
| mod_update_time | system clock | (4) |
| num_newsnr_bigger | min_bigsnr: 1: max_bigsnr | (5) |

Note:
(1) num_ack = number of ACK − number of missing ACK signal (this value is updated when the ACK signal is expected. For example, upon receiving the ACK when the ACK signal is expected, num_ack is increased by one; otherwise, num_ack is decreased by one.)
*ACK refers to a packet for received signal acknowledgement.
(2) 1: modulation mode of the lowest transmission mode ~ N: modulation mode of the highest transmission mode.
(3) Channel quality value (dB scale) in consideration of the effect of delay spread in addition to SNR.
(4) This record is a time when updating the modulation mode. A new modulation mode is recorded and the other elements are reset when this value is updated.
(5) The estimated snr_eff of the received signal is compared with the snr_eff value of the current ch_vector. If the estimated snr_eff is greater than the registered value, then this value is increased by one; otherwise, it is decreased by one.

Now, a description will be given as to the case where the first access point A receives data from the second access point B, with reference to FIG. 5.

The first access point A checks in step 501 whether or not a related signal is received from the second access point B. If the related signal is received, then the first access point A calculates the signal-to-noise ratio and the estimated distribution of channel power caused by delay spread, in step 502, and determines the corresponding effective signal-to-noise ratio snr_eff, in step 503.

If there is no received signal from the second access point B, then the first access point A checks in step 504 whether an acknowledgement (ACK) signal is received. If the ACK signal is not received, then the first access point A decreases the received signal acknowledgement frequency num_ack by "1", in step 505.

The effective signal-to-noise ratio snr_eff is defined as follows:

$$snr\_eff(dB) = snr\_est(dB) + (1 - ch\_pwr)*\alpha, \text{ for } 0 \leq ch\_pwr < 1 \quad \text{[Equation 10]}$$

where $\alpha$ is a negative real number. The effective signal-to-noise ratio snr_eff as defined above can be obtained theoretically or by a simulation according to the power distribution and the corresponding performance deterioration. The channel power ch_pwr represents the accumulated power $p_1/p_9$ as calculated above. If the channel status vector ch_vector includes old and expired data, in step 506, then the first access point A updates the field of effective signal-to-noise ratio snr_eff as a new estimated value, in step 507. The first access point A also updates a modulation mode modulation_mode determining the data rate as the modulation mode of the received signal, in step 508.

If the field of effective signal-to-noise ratio snr_eff is filled with a certain value, then the existing value is compared with the current estimated value. If the current value is greater than the existing value, then the signal-to-noise ratio increasing frequency number num_newsnr_bigger is increased by "1", in step 510; otherwise, it is decreased by "1", in step 509.

If the received signal from the second access point B is a signal such as a received signal acknowledgement for the packet transferred from the first access point A, in step 511, then the field of the effective signal-to-noise ratio snr_eff is updated and the field value of the received signal acknowledgement frequency number num_ack is increased by "1", in step 512.

If the acknowledgement signal for the received signal is not received, then the field value of the received signal acknowledgement frequency number num_ack is decreased by "1."

Subsequently, the first access point A updates the channel status vector ch_vector based on a received signal or an expected signal to be received from the second access point B, and determines the modulation mode for the data to be transmitted to the second access point B according to Table 2, in steps 513 to 516.

TABLE 2

| num_ack < min_ack | num_ack > max_ack | num_newsnr_bigger < min_bigsnr | num_newsnr_bigger > max_bigsnr | modulation_mode (++: increased by one, --: decreased by one) |
|---|---|---|---|---|
| True (Many no ACK) | X | X | X | -- |
| False | False | True (SNR is decreasing) | X | -- |
| False | False | X | True (SNR is increasing) | ++ |
| X | True (Many ACK) | X | True (SNR is increasing) | ++ |

As can be seen from Table 2, the modulation mode determining the data rate is increased by "1" when the received signal acknowledgement frequency number num_ack is less than a predetermined value min_ack, in step 517.

Namely, the data rate is lowered by one level, when the frequency of not receiving an expected received signal acknowledgement signal is high relative to the frequency of receiving a received signal acknowledgement.

On the other hand, if the received signal acknowledgement frequency number num_ack exceeds a predetermined value max_ack, then the modulation mode is changed according to the change of the effective signal-to-noise ratio snr_eff. Namely, when the data transmission is good (with a high ACK reception frequency) and the effective signal-to-noise ratio snr_eff is increasing, the value of the modulation mode is increased by "1", in step 518.

If the received signal acknowledgement (ACK) frequency is varied within an acceptable range and the effective signal-to-noise ratio snr_eff is increased (or decreased), in steps 519 and 520, then the value of the modulation mode is increased (or decreased) by "1," in steps 521 and 522.

In this manner, the apparatus and method for channel quality estimation and link adaptation in an OFDM wireless communication system according to the embodiment of the present invention estimates the quality of the communication link in consideration of the signal-to-noise ratio (SNR) and the delay spread causing frequency-selective fading, and performs a link adaptation based on the channel quality estimation, thereby enhancing the throughput.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The apparatus and method for channel quality estimation and link adaptation in an OFDM wireless communication system according to the present invention determines optimal data rate and transmit power in consideration of both the signal-to-noise ratio (SNR) and the delay spread to enhance the throughput, and for a mobile terminal, increases the usage time by an efficient operation of the transmit power.

What is claimed is:

1. A method for channel quality estimation and link adaptation, which is for an orthogonal frequency division multiplexing (OFDM) wireless communication system, the method comprising:
    (a) estimating a channel gain and a noise power, and measuring a signal-to-noise ratio in consideration of the estimated channel gain and the estimated noise power;
    (b-1) calculating a correlation value between an externally received preamble signal and a known preamble signal, and estimating a delay spread;
    (b-2) calculating a maximum of the calculated correlation value and determining a normalized accumulated power estimate using the calculated maximum;
    (c) measuring the quality status of a channel in consideration of the measured signal-to-noise ratio and the estimated delay spread; and
    (d) determining parameters including transmit power, data modulation mode, and data rate, according to the measured quality status of the channel, and performing a link adaptation.

2. The method as claimed in claim 1, wherein (d) comprises:
    using a protocol for acknowledging a normal data transmission at a data transmitter and a data receiver, as well as using the measured quality status of the channel.

3. The method as claimed in claim 1, wherein (a) comprises:
    calculating a signal-to-noise ratio according to an equation given by [(final channel gain estimate)$^2$/{averaged power of sub channels having pilot positioned therein −(channel gain)$^2$}]; and
    calculating an averaged signal-to-noise ratio in sub channels having a pilot positioned therein, using the calculated estimate.

4. The method as claimed in claim 1, wherein the number of OFDM symbols used in (a) is 15 to 20.

5. The method as claimed in claim 1, wherein (c) is performed in a physical layer,
    the physical layer providing the calculated signal-to-noise ratio and the normalized accumulated power estimate to a media access control layer,
    (c) comprising: performing a protocol for acknowledging a normal data transmission at a data transmitter and a data receiver as well as the estimated quality status of the channel.

6. The method as claimed in claim 1, further comprising:
    without information on the quality status of the channel, inferring channel-related information according to a signal received from a correspondent station, and performing a link adaptation.

7. The method as claimed in claim 6, wherein the received signal includes a signal-to-noise ratio, a channel status according to delay spread, and a reception acknowledgement signal for a corresponding packet.

8. An apparatus for channel quality estimation and link adaptation, comprising:
    an analog-to-digital converter for converting an externally received signal to a digital signal;
    a guard time remover for removing a guard time from the converted digital signal;
    a fast Fourier transform (FFT) unit for converting the signal removed of the guard time to a signal in a frequency domain;
    a channel quality estimator for measuring a quality status of a physical layer of a channel in consideration of a signal-to-noise ratio and a delay spread, using the converted digital signal and the signal in the frequency domain, the physical layer to provide the calculated signal-to-noise ratio and a normalized accumulated power estimate to a media access control layer; and
    a link adaptor for determining parameters including transmit power, data modulation mode, and data rate using the measured quality status of the channel and a protocol for acknowledging a normal data transmission at a data transmitter and a data receiver, and performing a link adaptation.

9. The apparatus as claimed in claim 8, wherein without information on the quality status of channel, the channel quality estimator infers channel-related information according to a signal received from a correspondent station and performs a link adaptation.

10. A recording medium with a built-in program, said recording medium including a method for channel quality estimation and link adaptation, the program comprising:
    estimating a channel gain and a noise power, and measuring a signal-to-noise ratio in consideration of the estimated channel gain and the estimated noise power;
    calculating a correlation value between an externally received preamble signal and a known preamble signal, and estimating a delay spread;
    calculating a maximum of the correlation value and determining a normalized accumulated power estimate using the calculated maximum;
    measuring a quality status of a channel in consideration of the measured signal-to-noise ratio and the estimated delay spread; and
    determining parameters including transmit power, data modulation mode, and data rate using the measured quality status of the channel and a protocol for acknowledging a normal data transmission at a data transmitter and a data receiver, and performing a link adaptation.

* * * * *